Dec. 18, 1956 A. G. THOMAS 2,774,922
STEP MOTOR AND CONTROL SYSTEM THEREFOR
Filed June 20, 1952 7 Sheets-Sheet 1
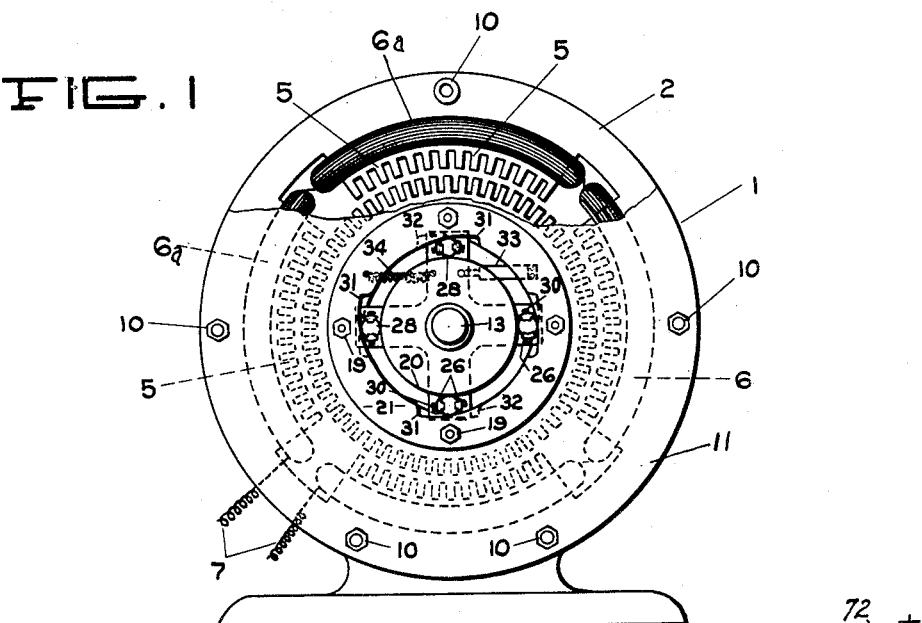
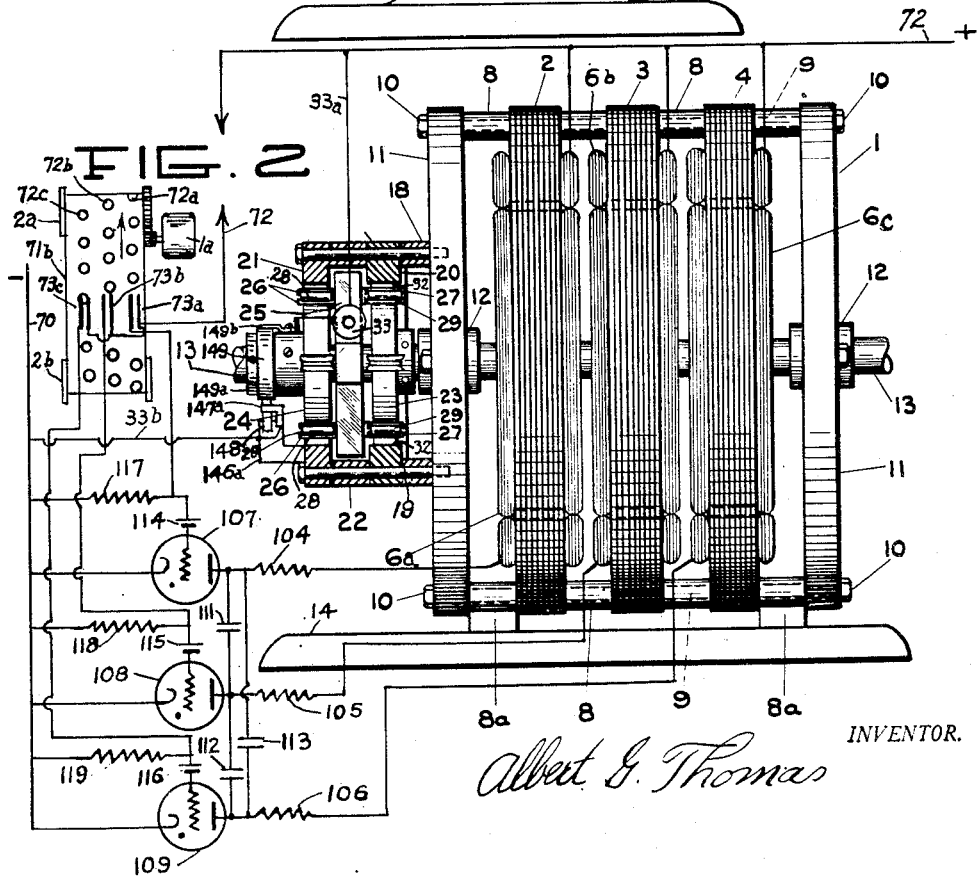
INVENTOR.
Albert G. Thomas Dec. 18, 1956    A. G. THOMAS    2,774,922
STEP MOTOR AND CONTROL SYSTEM THEREFOR
Filed June 20, 1952    7 Sheets-Sheet 2
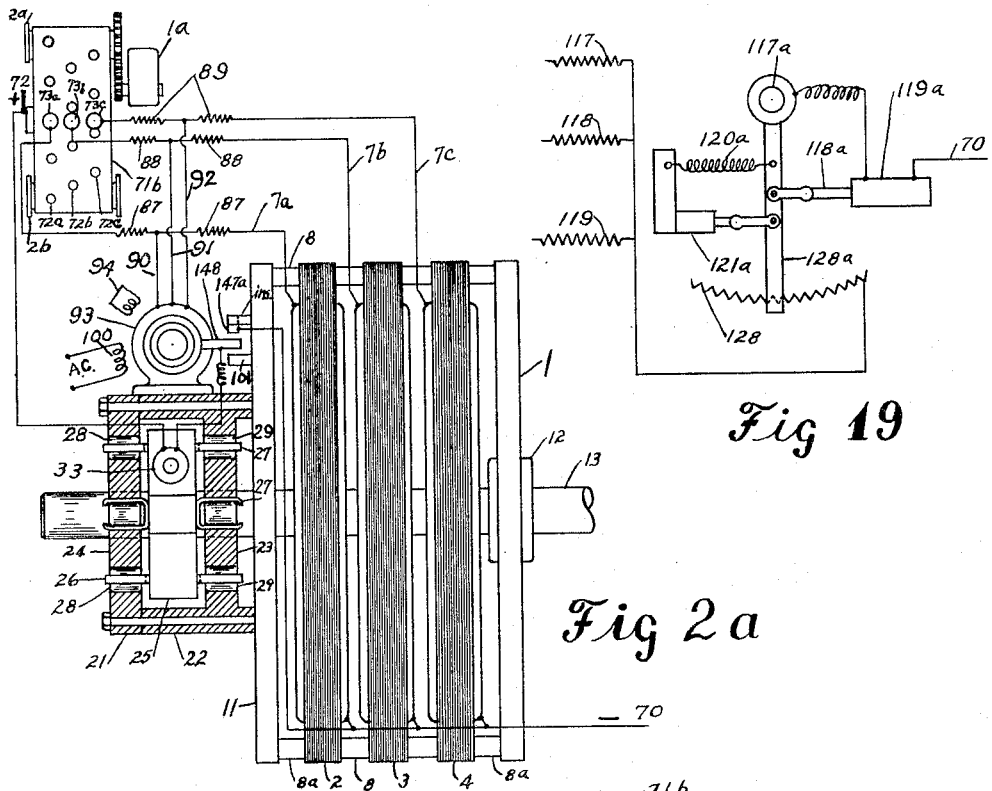
Fig 19
Fig 2a
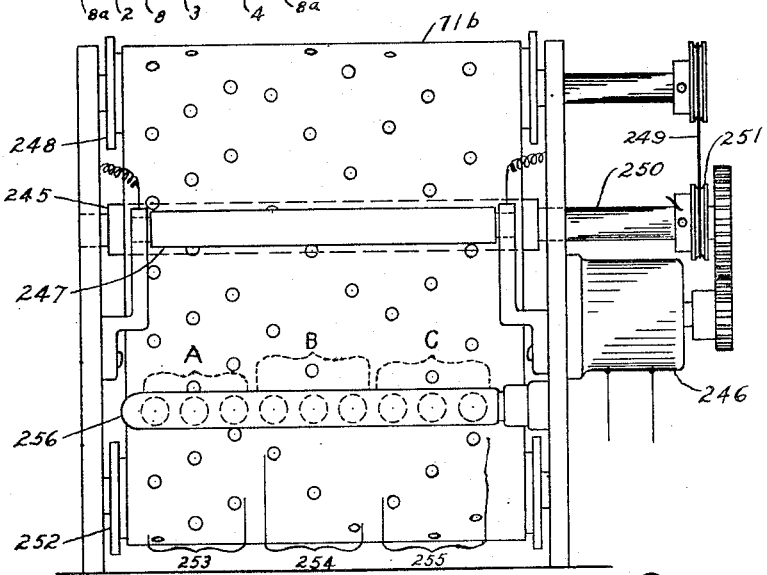
Fig 18    Albert G. Thomas
INVENTOR Dec. 18, 1956     A. G. THOMAS     2,774,922
STEP MOTOR AND CONTROL SYSTEM THEREFOR
Filed June 20, 1952          7 Sheets-Sheet 3
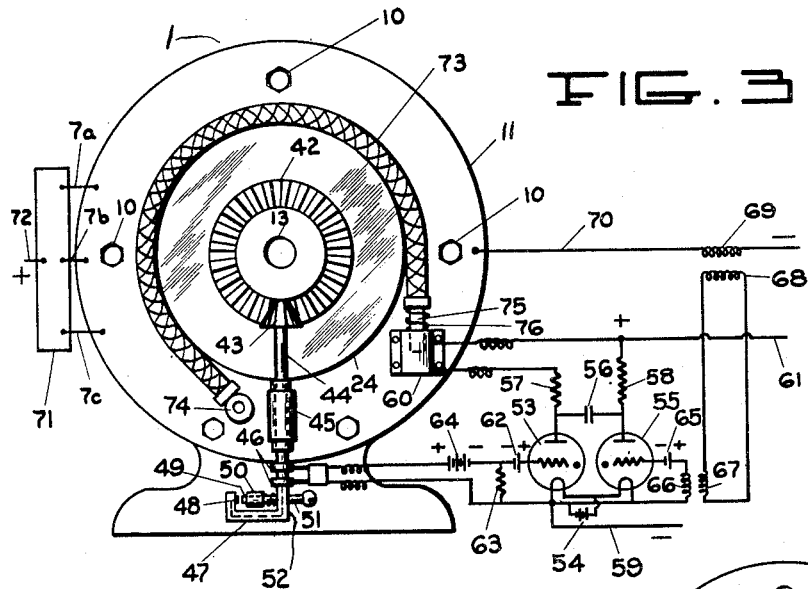
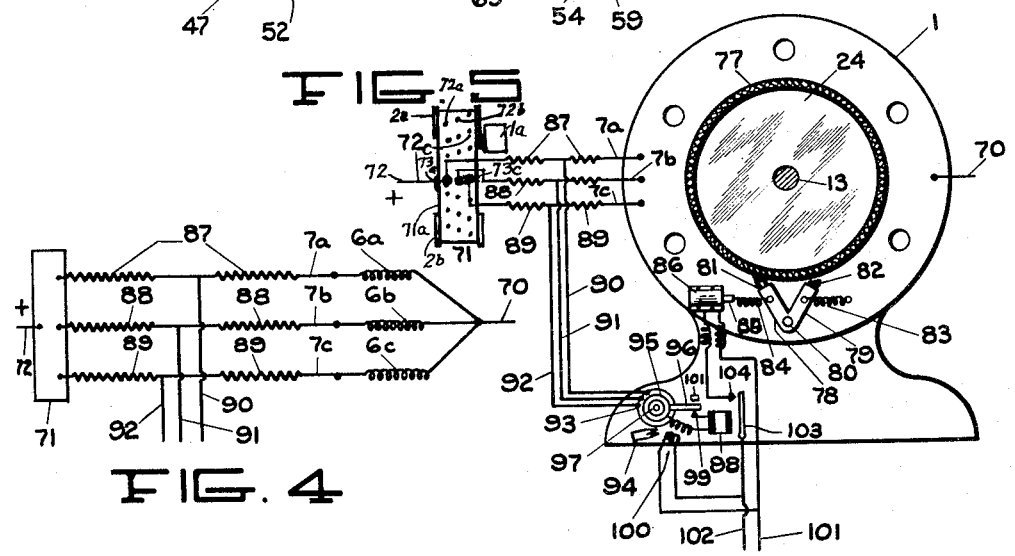
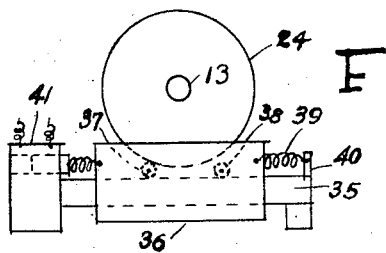
*Albert G. Thomas* INVENTOR.

Dec. 18, 1956  A. G. THOMAS  2,774,922
STEP MOTOR AND CONTROL SYSTEM THEREFOR
Filed June 20, 1952  7 Sheets-Sheet 4

INVENTOR.
Albert G. Thomas

Dec. 18, 1956     A. G. THOMAS     2,774,922
STEP MOTOR AND CONTROL SYSTEM THEREFOR
Filed June 20, 1952     7 Sheets-Sheet 5

*Albert G. Thomas*    INVENTOR.

Dec. 18, 1956 A. G. THOMAS 2,774,922
STEP MOTOR AND CONTROL SYSTEM THEREFOR
Filed June 20, 1952 7 Sheets-Sheet 6
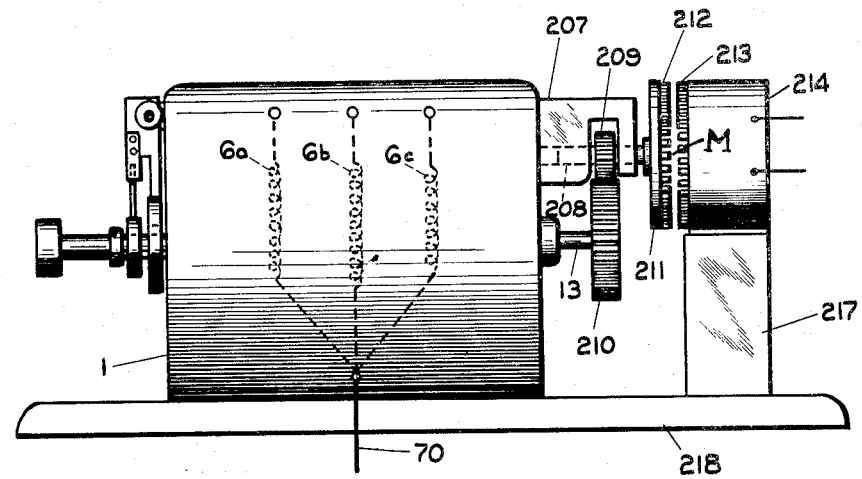
FIG. 11
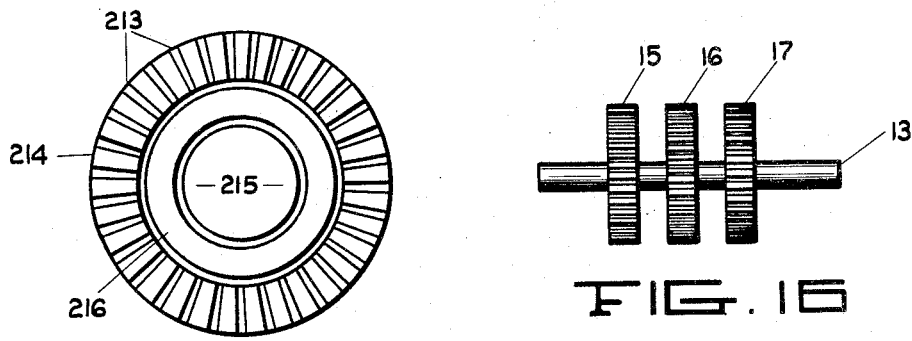
FIG. 12
FIG. 16
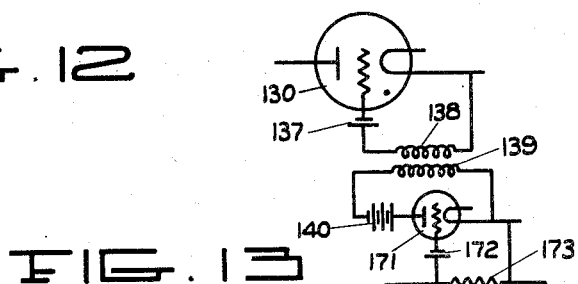
FIG. 13
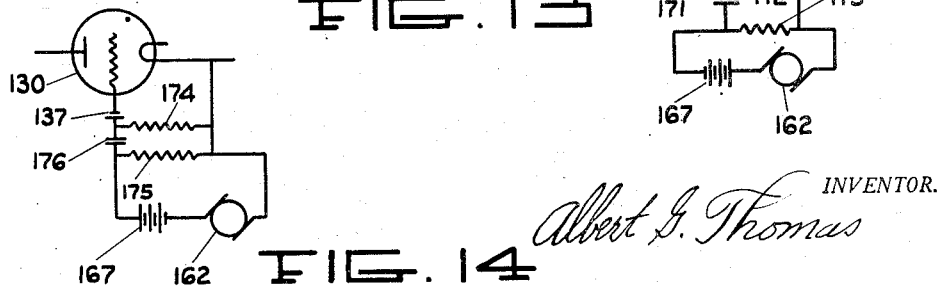
FIG. 14
INVENTOR.
Albert G. Thomas United States Patent Office 2,774,922
Patented Dec. 18, 1956

2,774,922
STEP MOTOR AND CONTROL SYSTEM THEREFOR
Albert G. Thomas, Chattanooga, Tenn.
Application June 20, 1952, Serial No. 295,694
38 Claims. (Cl. 318—162)

This invention relates to electromagnetic devices generally and particularly to step motors and positioning devices.

In remote controls, calculating machines, textile and paper machinery, indexing operations, valve and other controls, instrument reading duplication, radar systems, gun pointing, automatic machine tool controls, and servomechanisms generally, it is often desirable to have electromagnetic step motors or positioning devices operate in unison or through predetermined displacements. This has been difficult to achieve with usual motors. My improved positioning device or motor, however makes possible remarkably stable and satisfactory operation for the above mentioned and other applications. I have found that this motor, used either as a step-by-step positioning device or motor, or as a synchronous motor, provides quite accurate and desirable predetermined displacements or speed control as desired.

An object is to provide a step motor with mechanical means for preventing or reducing rotor hunting or oscillations.

Another object is to provide a step motor with electrical means for preventing or reducing rotor hunting or oscillations.

A further object is to provide a step-motor with electrical or mechanical oscillation-reducing means which may be automatically or manually reversed when the rotor is reversed in direction of rotation.

An additional object is to provide a step motor with a magnetic brake for locking the rotor at predetermined positions thereof in order to prevent rotor oscillation, or for other purposes.

Another object is to provide electrical, or mechanical and electrical means for controlling the operation of the aforesaid magnetic brake.

A further object is to provide a step motor with phased field and rotor teeth in order to control the movement of the rotor through small angular displacements.

An additional object is to provide means for reducing the field strength of the stator or rotor near the ends of step movements of the rotor, in order to reduce rotor oscillations.

Other objects will be evident in the following description.

In the drawings:

Figure 1 is an end elevation of a step motor with roller or ball type over-running clutches to prevent rotor oscillations, and with the cover shown broken away.

Figure 2, is a front view of the motor shown in Figure 1, and commutating means.

Figure 2a is a front view of the motor of Figure 1, showing circuit connections for the belt-modulated currents and the brake solenoid control circuit as shown and described in connection with Figure 5.

Figure 3 is an end elevation of a step motor with a friction brake and associated electronic control circuit, for preventing rotor oscillations.

Figure 4 is a schematic circuit diagram showing the three motor field winding and associated voltage-dropping resistors.

Figure 5 is an end view of a step motor having three field or stator elements and three phased rotor elements, and mechanical braking means electrically controlled to prevent rotor oscillations. The field windings may be connected as in Figure 4.

Figure 6 is an end view of a step motor and mechanism for damping rotor oscillations.

Figure 11 is a front view of the motor and magnetic clutch indicated in Figure 9.

Figure 12 is an elevation of the magnetizable field element of the clutch shown in Figure 11, looking to the right.

Figure 13 is a fragmentary circuit diagram showing a modification of the generator controlled circuit of Figure 8 in the drawings.

Figure 14 is a fragmentary circuit diagram showing another modification of the generator-controlled circuit of Figure 8.

Figure 16 is an elevation of a rotor having radial magnetizable teeth, suitable for use with the motors shown in Figure 1 and other drawings.

Figure 18 is a top plan view of a sensing device for use with the circuit of Figure 17, showing a light modulating belt and means for driving it.

Figure 19 is a fragmentary illustration of the circuit of Figure 7, but with a variable resistance controllable by the amount of load on the motor.

Figure 7:
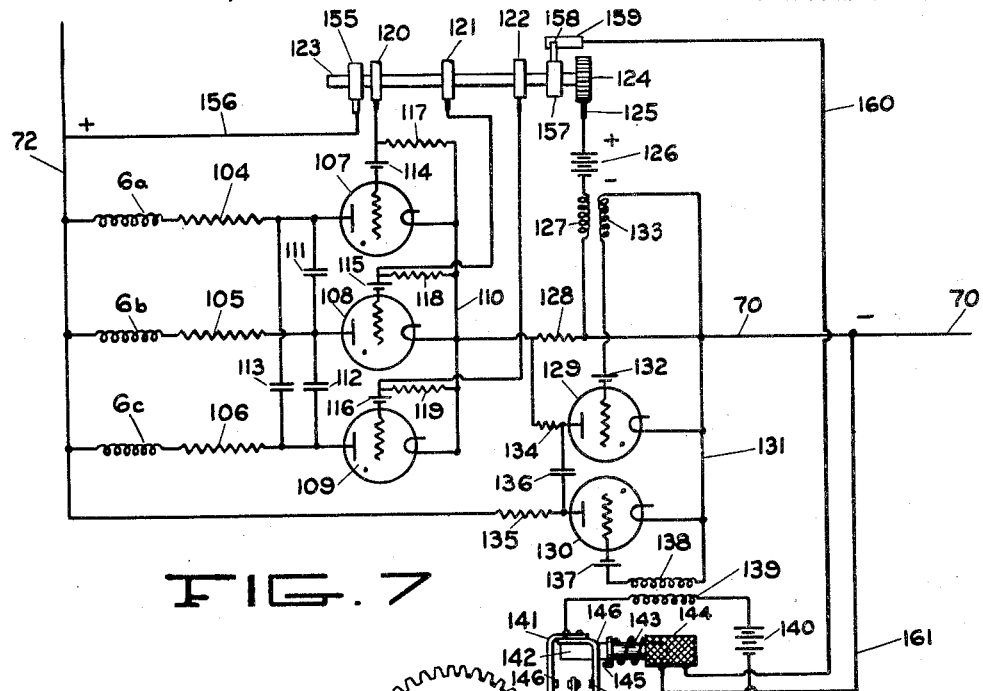
Figure 7 is a schematic circuit diagram suitable for use with the motor of Figure 5 and including a polarized relay for controlling the brake-operating solenoid.

In Figures 1 and 2, motor 1 has three stator or field sections 2, 3, and 4 each of which has a plurality of groups of magnetizable teeth 5 which are of equal width circumferentially and are spaced apart one tooth width. Four groups of teeth are shown but each stator may have any desired number of groups. Each group of teeth is wound with a magnetizing coil or winding 6 which is suitably held in place by straps or otherwise. These windings are shown connected in series for any one stator section and have terminal conductors 7 but they can be connected in parallel or series-parallel if it is desired to reduce self inductance.

The three stator units or sections are preferably laminated and are clamped against sleeve separators 8 by means of bolts 9 passing through the sleeves and holes through the stators and end plates 11 which have attached bearings 12 for rotor shaft 13 and which are rigidly clamped to bored supports 8a. The bolts are held by nuts 10.

The teeth 5 of the three stator sections or groups are in alignment with respect to a plane passing through the axis of shaft 13 and the three toothed rotor sections 15, 16, 17 (Fig. 16) are fastened to shaft 13 in axial positions so that they will be in proper axial alignment with the respective stator sections. These rotor sections are provided with uniformly spaced magnetizable radial teeth of the same circumferential width as the adjacent stator teeth and of the same spacing so that the rotor teeth can be brought into circumferential alignment with the stator teeth. The teeth of each rotor group or section are, however, phased with respect to the teeth of the other rotor section so that when any stator group winding is energized to bring associated rotor teeth into alignment with the teeth of that stator group, rotor teeth of the next group or section to be energized will then overlap the associated stator teeth of that section by one third tooth width in the direction of rotation. In this way the effective rotor teeth are always in position to be magnetically pulled into alignment with the teeth of the respective stator sections as they are energized in repeated order. The rotor is caused to revolve in this manner. The winding means for any one of the three groups is considered as applied to the magnetization of one whole field section or unit and its associated rotor unit, there being three groups or units in the motor, although there could be any number of units or phases.

While the windings are shown on the stator sections, it is obvious that the rotor sections could be wound instead of the stator or stators, or both can be wound. It is preferable that the rotor and stator laminations be made of silicon steel or other metal of good magnetic permeability and relatively high resistance to eddy currents. It is preferable also to insulate the clamping bolts from the laminations.

Metal ring 18 is bored so that a plurality of bolts 19 can be passed through it and screwed into threaded holes suitably positioned in the face of adjacent end plate 11. Bolts 19 are also passed through similarly spaced holes in cam ring 20 and outer cam ring 21 which have a spacing shoulder 22 as shown. These cams are therefore firmly clamped to end plate 11 in register with hardened steel discs 23 and 24 which are rigidly fastened to motor shaft 13 coaxially therewith, by means of suitable integral hubs and set screws or keys. The discs are therefore rotated with the shaft.

Cross-shaped piece 25 is centrally bored and is rotatably supported on shaft 13 between discs 23 and 24. The arms of this crosspiece have attached arcuate strips 26 extending perpendicularly from one face and similar strips 27 extending perpendicularly from the opposite face. These strips may be rigid or resilient and are turned over at the free ends to limit axial movement of rollers 28 nested between strips 26, and rollers 29 nested between strips 27. In case the strips are rigid they can be slotted in axial direction and strip springs 30 (Fig. 1) attached thereto can press the rollers so that resilient movement of these rollers within the bounding strips is possible. The strips may be anchored in curved slots in the faces of crosspiece 25 and the rollers are in contact with the peripheries of the respective associated discs 23 and 24. Strips 26 and 27 are narrower than the diameter of the rollers so that rollers 28 can be brought into contact with cam surfaces 31 of cam ring 21 and rollers 29 can be brought into contact with oppositely inclined cam surfaces 32 of cam ring 20. The resilient strips assure that each roller 28 will be pinched between disc 24 and a cam surface 31 when crosspiece 25 is rotated sufficiently in counterclockwise direction as viewed in Figure 1. This then allows rotation of shaft 13 and disc 24 in clockwise direction but not in the reverse direction.

Similarly, rollers 29 which ride on disc 23 will be pinched between that disc and cam surfaces 32 to prevent rotation of shaft 13 and disc 23 in clockwise direction when crosspiece 25 is urged in clockwise direction by solenoid 33 the armature of which is attached to crosspiece 25 and the winding of which is attached to ring 21. Tension spring 34, attached to ring 21 and crosspiece 25 normally urges the crosspiece and supported rollers in counterclockwise direction so that rollers 28 are wedged against cam surfaces 31 and rollers 29 are moved out of contact with cam surfaces 32. Normally, therefore, shaft 13 may be revolved in clockwise direction but not in the reverse direction. If it is desired to lock the shaft against clockwise rotation but to allow counterclockwise rotation, then solenoid 33 is energized by a suitable current so that crosspiece 25 is rotated clockwise until rollers 29 are wedged against cam surfaces 32 and rollers 28 are released.

Assuming that the three stator sections are energized in proper order to cause clockwise rotation of shaft 1 in steps, as viewed in Figure 1, then it will be seen that as the various rotor sections are magnetically snapped into alignment with the respective stator sections, there would be rotor oscillation if some means were not provided to prevent it. This is accomplished by locking the rotor against reverse swing, by means of rollers 28 and cooperating cam surfaces 31 and disc 24. The rotor is magnetically snapped forward and is locked substantially in the most forward position, the locking occurring when the rotor is virtually at standstill, so that shock is avoided. The magnetic pull on the rotor, tending to pull the effective rotor teeth back into alignment with the associated stator teeth then serves to hold the rotor in fixed positions until the next succeeding stator section is energized to pull the rotor forward another step. I have found that this oscillation prevention means is quite practical and effective in operation.

As shown in Figure 6, it is possible to use only one braking or locking disc for both directions of rotation. Disc 24 is attached to shaft 13 as before. Bar 35 is bolted to the framework of the motor and supports slidable carriage 36 carrying rollers 37 and 38. The carriage is normally pulled to the right by tension spring 39 fastened to the carriage and to extension 40 from bar 35. Roller 37 is therefore normally wedged between disc 24 and bar 35. Similarly, when solenoid 41 is energized, its armature pulls carriage 36 to the left by means of a stiff spring connection so that roller 37 is moved away from disc 24 and roller 38 is wedged between disc 24 and bar 35 to prevent rotation of the disc and shaft in clockwise direction. Solenoid 41 is attached to bar 35. It will thus be seen that the locking means is continuously effective and is instantaneously operative to prevent rotation in a direction opposite to that determined by the order of energization of the stator sections. That is to say there is no deliberate lost motion or backlash in the locking system so that under ideal conditions locking occurs absolutely instantaneously.

In this specification like numerals will be used to designate like parts, where practicable.

Figure 2 shows a tape or belt type distributor to supply current to the windings 6a, 6b, and 6c, of the three motor sections 2, 3, and 4, respectively. Motor 1a, through suitable gearing, drives belt or tape 71b made of rubber, plastic, or other insulating material. Lines of individual contacts 72a, 72b, and 72c are fastened to the belt by cement, printing, or in any suitable manner as by molding, electrodeposition, or the like. These contacts may be made of thin metal or other conductive material or they may comprise metallic coatings or paint sprayed on or painted on the belt. They could likewise comprise carbon or metal powder pressed into the belt or otherwise attached.

The belt is rolled over reels 2a and 2b between which is a suitable supporting surface beneath pairs of spaced flexible brushes 73a, 73b, 73c which are fixed to a support (not shown) and which are arranged at an angle to allow the belt to slip beneath them in the direction of the arrow. These brushes may be resilient metal strips and are arranged in adjacent pairs which are connected in the circuit as illustrated. Normally no current will pass from one member of a pair to the other member when the insulating belt is passing beneath but when a conductive contact element 72a, 72b, or 72c bridges an associated pair of brushes which are urged against the belt, current will then be conducted through the respective brush pair to the grid circuit of one of the thyratrons 107, 108, or 109. Thyratron 107 is connected in series with field winding 6a and resistor 104, between negative line 70 and positive line 72, as shown. Similarly, field winding 6b is connected in series with resistor 105 and thyratron 108 from positive supply line 72 to negative supply line 70; and field winding 6c is connected in series with resistor 106 and thyratron 109, between lines 72 and 70 as indicated. Quenching condensers 111, 112, and 113 are connected between the anodes of thyratrons 107–108, 108–109, and 107–109, respectively. These condensers, in conjunction with resistors 104, 105, and 106, serve to extinguish any conducting thyratron when any other thyratron is fired.

Resistor 117 is connected between negative line 70 and the positive terminal of bias battery or other source 114 the negative terminal of which is connected to the grid of thyratron 107. Similarly, resistor 118 is connected in series with bias battery 115, between the grid of thyratron 108 and line 70, and resistor 119 is connected in series with bias battery 116 between the grid of thyratron 109 and line 70. The thyratrons are normally biased sufficiently negatively so that they do not fire.

The right hand brushes of the pairs 73a, 73b, and 73c are connected together and to line 72. The left brush of the pair 73a is connected to the positive terminal of battery 114, and similarly, the left brushes of the pairs 73b and 73c are connected, respectively, to the positive terminals of batteries 115 and 116.

Metal collar 149 having attached contact arm 148 is held laterally on shaft 13 by means of collar 149a fastened to the shaft. Collar 149 has a slipping connection with the shaft, friction being provided by spring strip 149b which is fastened at one end to a fixed collar on the shaft. Stop member 146a, of insulation material and shaped as indicated, is attached to ring 21. This member acts as a stop for contact arm 148 when the motor is rotating in forward direction, and metal contact member 147a, attached to member 146a limits movement of arm 148 when the motor is rotating in reverse direction. One terminal of solenoid 33 is connected to line 72 by conductor 33a, and the other terminal of the solenoid is connected to a brush having rubbing contact with the collar supporting spring strip 149b. Contact member 147a is connected to line 70 by conductor 33b.

In operation, motor 1a is energized from lines 72 and 70 or another suitable source so that belt 71b is moved in the direction of the arrow, at uniform speed if desired. It will be seen that a contact 72a will first bridge brush pair 73a with the result that current will flow through resistor 117 in a direction to bias the grid of thyratron 107 positively to fire that thyratron supplying current to windings 6a. As the belt moves, a contact 72b will next bridge brush pair 73b to cause current to flow through resistor 118 to fire thyratron 108. When this happens thyratron 107 will be extinguished, through the agency of condenser 111, and consequently windings 6b will be energized to cause the rotor of motor 1 to move another step forward. Then a contact 72c bridges brush pair 73c with the result that current is passed through resistor 119 and thyratron 109 is fired, thyratron 108 being simultaneously extinguished by means of condenser 112. Then the cycle is repeated; each time a thyratron is fired the rotor moves one step forward.

If it is desired to reverse the direction of rotation of motor 1, the rows of contacts 72a, 72b, and 72c will be reversed in their order of striking their respective brush pairs so that brushes 73c will be bridged before brushes 73b and the latter will be bridged before brushes 73a. This arrangement of the contacts is shown on the belt just above reel or spool 2b. If it is desired that motor 1 remain stationary the belt will have no contacts, the current through the last fired thyratron holding the motor magnetically locked in position. I have found that greater magnetic locking action is provided when one thyratron remains fired rather than when two or three are fired. Assuming a constant speed of belt 71b, the speed of revolution of the rotor of motor 1 will be inversely proportional to the lengthwise spacing of the contacts along the belt.

As long as shaft 13 is rotated in forward or clockwise direction, as seen in Figure 1, contact arm 148 is held down against insulating member 146a since the rotating shaft 13 will, through friction, tend to carry arm 148 in the same direction. Rollers 28 are then effective to prevent backswing of the rotor. When, however, shaft 13 is rotated in reverse direction, arm 148 is brought up against contact member 147a with the result that solenoid 33 is electrically connected with lines 72 and 70 and accordingly, the solenoid armature pulls cross member 25 toward the solenoid so that rollers 29 are made effective to prevent back-swing when the motor is rotating in reverse direction; as described elsewhere in the specification. Amplifying mechanism can be used to close the contacts after very small movement of the shaft so that rollers 28 will not lock against reverse rotation.

The motor of Figure 2a is the same as that shown and described in Figure 1 except that contact arm 148 is operated by a selsyn motor 93 instead of by slipping ring 149 which is eliminated. The electrical connections are as shown in Figures 4 and 5. When the order of energization of the conductors is, say 92–91–90, the selsyn will tend to rotate in one direction moving contact arm or relay arm 148 in a direction to close the contacts and so to energize solenoid 33, thereby setting the brake mechanism for counterclockwise rotation of shaft 13 as seen in Figure 1. When the order of energization of the conductors is 90–91–92, the selsyn motor reverses and arm 148 is rotated away from contact 147a and the solenoid circuit is opened, the spring then arranging the brake mechanism for reverse or clockwise rotation of shaft 13. The remaining construction and operation are as described in connection with Figures 1 and 5.

Figure 17:
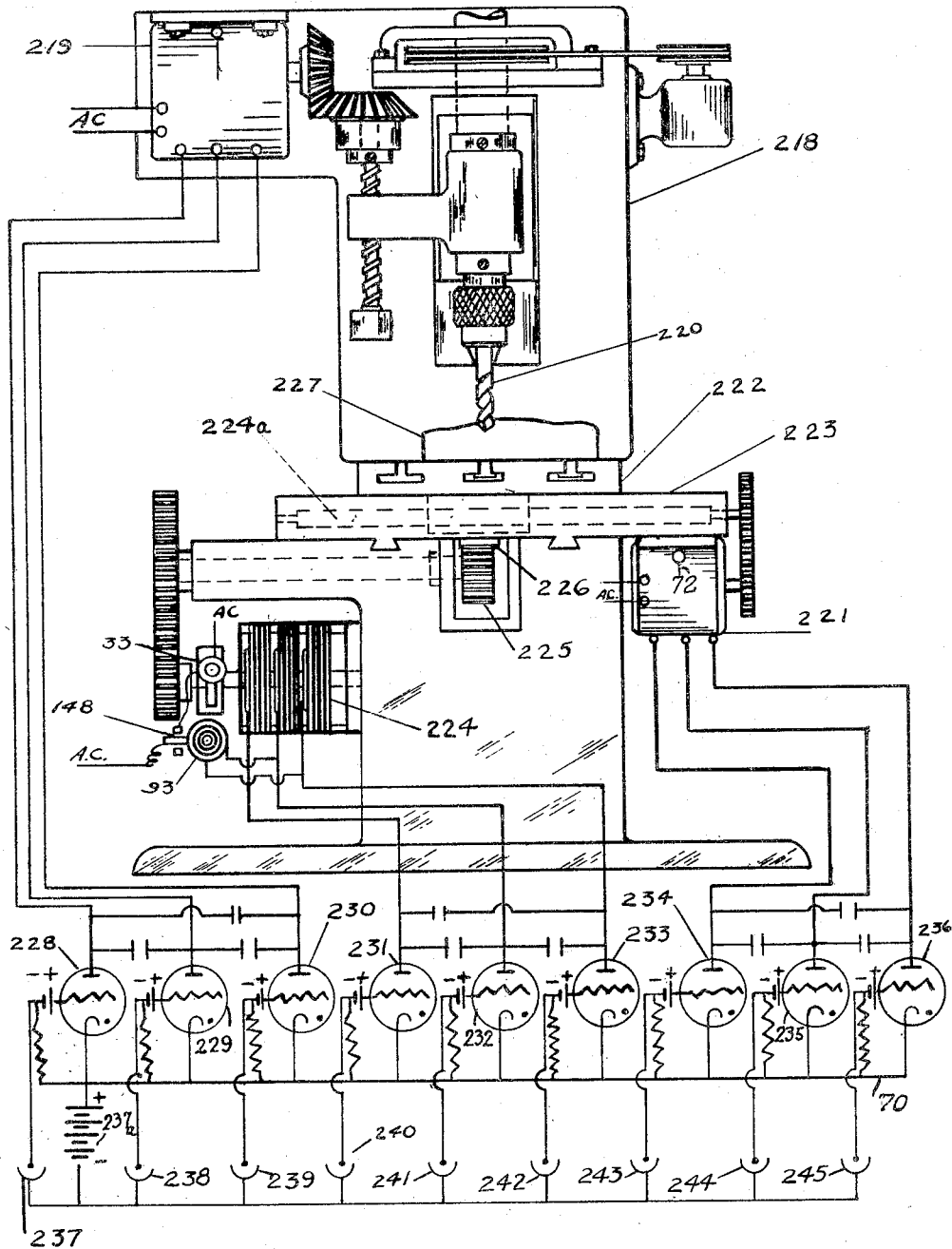
Figure 17 is an elevation of a milling machine employing my step motors, and showing circuit connections for controlling these motors by means of photocells responsive to light modulated by a moving tape or belt.

In Figure 17 the milling machine 218 has step motor 219 for lifting and lowering cutting tool 220. It also has similar step motor 221 for driving cross table 222 laterally across lower table 223 by means of screw 224a, and it likewise has similar step motor 224 which drives pinion 225 and meshed rack 226 to drive lower table 224 to and from the observer. Workpiece 227, fastened to table 222, can therefore be moved in a horizontal plane along two perpendicular axes and the tool can be lifted and lowered, providing three-dimensional control.

The circuit connections are similar to those shown in Figure 2. Thyratrons 228, 229, and 230 control motor 219; thyratrons 231, 232, and 233 control motor 224; and thyratrons 234, 235, and 236 control motor 221. The motor 219 is controlled by phototubes 237, 238, and 239; and motor 224 is controlled by phototubes 240, 241, and 242; and motor 221 is controlled by phototubes 243, 244, and 245. These phototubes are connected so that when they are illuminated, current passes through the grid resistors in a direction to bias the grids negatively and so to prevent the thyratrons from firing. When, however, a dark spot on the belt blocks light from striking any phototube, the negative bias due to phototube current is reduced so that the positive-connected grid bias batteries or other source of potential causes the associated thyratron to fire. Battery or other current source 237a furnishes current for the phototubes, connected as shown. The extinguishing condensers act as previously described.

Motor 224 is shown with cover removed and selsyn motor 93 of Figure 5 is used to operate the contact arm 148 of Figure 2, to energize solenoid 33 when the motor is reversed. The motors 219 and 221 are likewise equipped with selsyn motors and associated reversing mechanism, within the covers.

In Figure 18, belt 71b is made of plastic, tracing cloth, or other transparent or semi-transparent material and is driven by under roller 245 which is rotated by motor 246. Upper pivoted roller 247 may be pulled down against the belt by springs to provide driving friction. The belt is wound on spool 248 driven by belt 249 which slips when the belt 71b is taut. Belt 249 is driven by pulley 251 fastened to shaft 250 supporting roller 245. The belt 71b is unwound from spool 252 and carries three lines of spaced dark spots 253 controlling photocells 237, 238, and 239; and three lines of dark spots 254 controlling photocells 240, 241, and 242; and three lines of dark spots 255 controlling photocells 243, 244, and 245. These spots may be printed, photographed, or otherwise applied to belt 71b. The spots are equivalent to contacts or holes 72a, 72b, and 72c of Figure 2, but reduce the amount of light striking the photocells instead of increasing the light.

The photocells are mounted in a closed housing which has nine holes in the top cover in groups of threes; namely, A, B, and C. These holes are placed above the respective photocells so that light from elongated lamp 256 will strike all the photocells except those that may be covered or obscured by spots. When motor 246 is energized so that the belt 71b is driven, the light to the photocells will be modulated by the dark spots, causing the associated thyratrons to fire whenever the associated photocells are deprived of light. Each time a thyratron fires, the connected step motor on the milling machine, or other machine tool, will move one step and reversal of the motors is accomplished by the change of inclination of the spots for any three lines. Similarly, the speed of any step motor is inversely proportional to the distance of separation of the spots along the three associated lines, assuming uniform speed of the belt. The milling machine will, therefore, shape the workpiece in three dimensions according to the information on belt 71b. This belt can be reduced in length by microfilming and using the microfilm as a tape, with enlarging lens if necessary.

While three rows of contacts are shown on the belt, it is obvious that nine rows of contacts could be used so that three step motors of the type described could be employed, to control movements of any objects or devices in three dimensions or along three axes. The moving belt will then coordinate the operation of all three motors. A control device of this kind is useful for automatic machine tool controls in which one motor moves the workpiece along one axis, a similar motor moves the workpiece along an axis at right angles to the first axis, and the third motor lifts and lowers the cutting tool.

I have found that an automatic machine tool control of this type can be made quite accurate and will duplicate results in three dimensions. The first two motors would control the table of a milling machine for instance, the third motor controlling the depth of the cutting tool. This control can be used for lathes, grinders, or for many other operations such as indexing, feeds, synchronous operations of all kinds such as paper and textile mill drives, presses, and for other uses. For instance the control can cause a tool to bore a hole in a workpiece, then another hole at a specified distance, then it will automatically cut a slot to any desired depth at any chosen position, and finally the workpiece will be shaped in any desired way. All of these operations are automatic; controlled by the tape or belt. Furthermore the control is highly useful in determining sequential operations such as boring, milling, lathe work and the like. The motors can be controlled by records of any suitable kind. These motors are likewise useful in military applications like gun pointing, radar systems, and for other purposes.

It is not essential to use contact elements on the belt as metal particles can affect the grids by changing capacitance, or by magnetic induction, or the belt can be transparent with dark marks thereon and can modulate light beams striking photocells which control the grid circuits.

While a belt is shown, it is obvious that commutators, relays, or any other suitable means can be used for supplying current to the motor section or group windings in proper order; or to the thyratrons, as desired.

In Figure 3, similar motor 1 has disc 24 attached to shaft 13 to which bevel gear 42 is also attached. This gear is meshed with bevel pinion 43 fastened to shaft 44 which is rotatable in bearing 45 attached to end plate 11 of the motor. Suitable collars on shaft 44 are fastened thereto on either side of bearing 45 to prevent axial movement of the shaft which carries slip rings 46 and which is bent to form U-shaped arm 47 carrying insulated contact 48. Contact 49 is attached to heavy sleeve 50 which is horizontally slidable on counter-balanced shaft 51 fixed to vertical leg 52 of arm 47. A tension spring surrounding shaft 51, extended, is fastened to sleeve 50 and to leg 52 and normally pulls contact 49 away from contact 48, thus opening the circuit containing the contacts, slip rings 46 and associated brushes and the grid circuit of thyratron 53 which has a common cathode current supply 54 feeding also the cathode of thyratron 55. The anodes of these thyratrons are connected through quenching condenser 56, and dropping resistor 57 is connected in series with thyratron 53, solenoid 60, and positive line 61. Dropping resistor 58 is connected in series with thyratron 55 and positive line 61. Negative line 59 is connected to the cathodes of the thyratrons.

The grid of thyratron 53 is normally made positive by bias battery 62 connected to the cathode through resistor 63. Battery 64 is of higher voltage than battery 62 and is connected in series with slip rings 46 and resistor 63, the polarity being chosen so that current from battery 64 will flow through resistor 63 when contacts 48 and 49 are closed in such direction that a net negative bias will be placed upon the grid of thyratron 53. When the contacts are separated, the grid is made positive by battery 62.

The grid of thyratron 55 is normally made negative by bias battery 65 connected to the cathode of that tube through transformer secondary 66 the primary 67 of which is connected in series with transformer secondary 68 in inductive relationship with transformer primary 69 connected in the common negative line 70 leading from motor 1. The three section or field windings 6a, 6b, 6c (Fig. 4) are supplied current in proper order through positive conductors 7a, 7b, 7c, leading from distributor 71 which is supplied current from positive line 72. This distributor can be a suitable commutator or other means.

Flexible brake band 73 is positioned around a portion of the periphery of disc 24 and has attached end element 74 fastened to the motor casing. Solenoid armature 75 is attached to the other end of the brake band and may be magnetically drawn into solenoid 60 which is attached to the motor casing. Compression spring 76 surrounding the armature normally maintains the armature in lifted position so that brake band 73 lies loosely against the disc. When, however, the solenoid is supplied current by firing thyratron 53, the armature is quickly drawn deeper into the solenoid so that a powerful braking action is applied against angular movement of disc 24 and attached motor shaft 13.

In operation, assuming that positive line 72 and negative line 70 are connected to a suitable source of direct current, the distributor 71 will apply current to the field windings 6a, 6b, 6c in proper order so that the three rotor sections will be magnetically pulled into alignment with the associated stator sections in proper sequence to cause rotation of the motor shaft 13. This distribution of current can be at a relatively slow rate to cause step by step rotation of the rotor or it can be so rapid that the motor shaft is revolved virtually continuously. I have found, however, that due to the tendency of the magnetized rotor teeth to swing past the aligned position with respect to the associated magnetized stator teeth, there is a magnetic back pull on the rotor teeth which, if not properly timed with respect to the distributor, often causes irregular operation even at times to the point of complete break-down of torque.

In order to make ineffective this harmful reverse torque which may neutralize the forward torque of the next succeeding magnetized section, I apply a braking action to the disc and shaft at or near the end of travel of any step movement of the rotor in normal or forward direction. This braking action is automatically removed when each succeeding motor section winding is energized. These effects are accomplished in the following manner. When any section winding is energized by current from distributor 71 the associated rotor teeth are magnetically attracted toward the adjacent magnetized stator teeth and they swing past the aligned position due to momentum of the rotor. After the rotor teeth pass the aligned position the magnetic back pull decelerates the rotor and will bring it to rest within one step displacement if sufficient time is allowed which may be a fraction of a second. When the rotor is decelerated to a predetermined degree, as determined by the weight and position of sleeve 50 and the strength of the attached spring, the contact of sleeve 50 will be pulled away from contact 48 by the spring tension so that the circuit including battery 64 will suddenly be opened with the result that battery 62 will become effective and will cause firing of thyratron 53. Before this instant the centrifugal force of sleeve 50 rapidly moving in its arcuate path will cause its contact to be pressed against contact 48. Therefore when any section of the motor is first energized the contacts will be quickly closed and when the rotor is sufficiently decelerated the contacts are opened. The tension of the spring or the weight or the position of sleeve 50 may be adjusted to calibrate the device for opening the contacts at desired speeds of the rotor or deceleration rates. The contacts will be opened and closed properly for either direction of rotation of the rotor, which direction may be determined by the order of energization of conductors 7a, 7b, 7c and connected field windings.

When the rotor is moving rapidly the contacts are closed so that battery 64 maintains the grid of thyratron 53 negative and therefore this tube does not then pass current. When, however, the contacts are separated the tube is fired, as previously described, and solenoid 60 is energized so that brake band 73 is quickly and tightly pulled against disc 24 by armature 75 to prevent or reduce rotor back swing. Tube 53 remains fired until the next succeeding motor section is energized by the distributor. When this happens there is sudden reduction and then increase of current in transformer primary 69, resulting in an induced pulse in secondary 68 which pulse is passed through primary 67 so that a pulse is induced in properly connected secondary 66 so that the normal negative grid bias from battery 65 is overcome by the induced positive pulse with the result that thyratron 55 is fired. When this tube is fired thyratron 53 is quickly extinguished through the agency of condenser 56 and associated resistors 57 and 58. Similarly, when tube 53 is fired tube 55 is extinguished. Therefore tube 53 is fired to energize the solenoid to apply braking action whenever the contacts are separated at or near the ends of forward travel of rotor step movements and the braking is automatically released by firing tube 55 thereby extinguishing tube 53 at or near the beginning of each rotor step movement, or at the initial energization of each field section in sequence. This causes satisfactory rotation of the rotor, either slowly or rapidly. The springs should be sufficiently stiff to react sufficiently quickly for the purposes for which they are employed. A condenser or other time delay means can be used to apply the firing pulse to tube 55 after contacts 48 and 49 are separated.

It should be understood that specific mechanism or construction shown need not be employed as the details of design can be widely varied. The drawings are intended to illustrate principles rather than specific details of constructions.

In Figure 5, motor 1 is constructed in similar manner to the motors shown in Figures 1, 2, and 3, except that the braking or damping mechanism is different. Disc 24, which is attached coaxially to shaft 13 has brake band or friction material 77 closely fitted around its periphery and firmly attached by screws, rivets, cement, or by other means. Integral arms 78 and 79 form a relatively heavy V-shaped element which can be rocked about pivot 80 which comprises a bolt passing through a bore in the V-element and which is screwed into a threaded hole in the motor casing or frame. Recesses are provided in the ends of arms 78 and 79 and friction or brake elements 81 and 82 are pressed into these recesses. Elements 81 and 82 may be made of the same material as band 77. The arms and elements 81 and 82 are arranged at such an angle and are of such dimensions that element 81 will grip band 77 and will prevent rotation of disc 24 and the attached motor shaft in counterclockwise direction but will allow rotation in clockwise direction, when arm 78 is urged in clockwise direction about pivot 80. At the same time element 82 is moved out of engagement with band 77. Similarly, when arm 79 is yieldingly forced in counterclockwise direction about pivot 80, element 82 will be pressed against band 77 to prevent rotation of the motor shaft in clockwise direction but allowing rotation thereof in counterclockwise direction; and element 81 will be moved out of contact with band 77.

One end of tension spring 83 is attached to arm 79 and the other end of the spring is attached to the motor casing so that spring 83 normally pulls element 81 into yielding engagement with band 77. The normal or forward direction of rotation of the rotor is therefore in clockwise direction and the rotor is locked or braked against backswing. For reverse rotation of the rotor the following means are provided. One end of stiff tension spring 84 is attached to arm 78 and the other end of the spring is fastened to armature 85 of solenoid 86 which is screwed to the motor casing. Spring 84 is considerably stiffer than spring 83 so that element 82 will be pulled against band 77 when the solenoid is energized, with the result that element 81 is brought out of engagement with band 77. In this case element 82 grips band 77 and prevents backswing in clockwise direction but allows reverse or counterclockwise rotation. I have found that this mechanism is quite effective in causing smooth action of the motor in either direction.

In order to cause energization of solenoid 86 upon reversal of direction of rotation of the rotor, resistors 87, 88, and 89 may be connected in series with the three field supply conductors 7a, 7b, and 7c, and with distributor 71. Conductors 90, 91, and 92 are tapped into these resistors at suitable points, chosen to provide the required potential difference, and are connected to the three secondary terminals of self-synchronous or selsyn motor 93 the field or primary winding 94 of which is short-circuited as I have found that this provides greater power in the motor. This motor, however, could be a miniature of my step motors described. Collar 95, having attached contact arm 96, is suitably supported on motor shaft 97 and has slipping frictional engagement therewith through the agency of spring washers or otherwise. A stop is fastened to the end of the shaft to prevent the collar from sliding off. One terminal of relay coil 98 is connected with contact 99 suitably supported and insulated so that contact arm 96 may be brought down against it to close the circuit including the secondary of transformer 100 which may be of small power output. Stop 101 is provided to limit movement of arm 96 in a counterclockwise direction. The primary of transformer 100 is connected to A. C. line conductors 101 and 102, connected respectively to a terminal of solenoid 86 and to relay arm 103 which is pulled against relay contact 104 when the relay is energized. The relay is normally open for forward or clockwise direction of rotation of the rotor and shaft 13. Contact 104 is connected with the other terminal of solenoid 86.

In operation, the shaft of self-synchronous or similar motor 93 is caused to revolve in counterclockwise direction due to currents passed through conductors 90, 91, and 92 as a result of potential drops across resistors 87, 88, and 89, or tapped portions thereof, as distributor 71 feeds current to the field windings 6a, 6b, and 6c of motor 1, connected as shown in Figure 4. This causes arm 96 to be held against stop 101, due to the frictional slip connection. When the distributor is caused in any manner to reverse the order of current supply to the field windings in order to reverse the direction of rotation of motor 1, the order of current supply to the secondary windings of synchronous motor 93 is simultaneously reversed so that arm 96 is quickly brought down against contact 99 and relay coil 98 is energized so that relay armature or arm 103 is brought into engagement with contact 104 to cause energization of solenoid 86, resulting in arms 78 and 79 being quickly pulled over to move element 81 out of engagement with band 77 and quickly thereafter to bring element 82 into contact with band 77 to produce smooth operation of the motor in reverse direction. The braking or damping device is therefore automatically set for either direction of rotation of the shaft of motor 1.

The distributor 71 may be constructed as indicated in Figure 5. Belt 71a has a backing of thin metal or other electrically conductive material and is coated with rubber, plastic, or other non-conductive material. Contacts 72a, 72b, and 72c are connected with the metal back layer and preferably project through holes in the upper insulating layer until their surfaces are flush with the upper surface of the insulation material. These contacts may be of the same metal as the belt, or otherwise, and are arranged in parallel rows as indicated so that a contact 72c will first strike brush 73c connected to conductor 7c and then a contact 72b will strike brush 73b connected to conductor 7b, and finally a contact 72a will strike the remaining brush 73a connected to conductor 7a. When any brush is touched by a contact, line 72, which has rubbing contact with the metal portion of the belt, is connected to the associated field winding of the motor 1. The belt is movable over reels 2a and 2b, being suitably supported. Motor 1a drives reel 2a through suitable gearing, to move the belt in the direction of the arrow. Therefore, as the belt moves, the contacts are brought into connection with the brushes in proper order to cause rotation of motor shaft 13 in one direction unless the angle of the contacts is reversed as shown below the brushes. If this alignment of the contacts is used the motor 1 will reverse since the order of energization of the first and third motor sections will be reversed.

The speed of the motor 1 can be varied by changing the speed of movement of belt 71a, or by varying the spacing of the groups of contacts. The further apart the contacts are, lengthwise of the belt, the slower motor 1 will revolve, for any given speed of the belt. The contacts can be elongated to hold the energization of the motor windings for longer periods if desired. When it is desired to hold the motor stationary, magnetically locked, a continuous strip contact on the belt can be used.

This strip can be one of the three lines of contacts made continuous rather than as separate contacts. It is, of course, feasible to use a separate continuous line contact to cause energization of the solenoid operating the brake-shifting mechanism when it is desired that the motor be reversed. This will eliminate the necessity for using selsyn motors or the like.

The moving belt therefore feeds energy to the three motor sections in proper order to cause rotation, since the current energizes the three motor sections in order, the current passing from positive line 72, through the motor, and through negative line 70.

Figure 8:
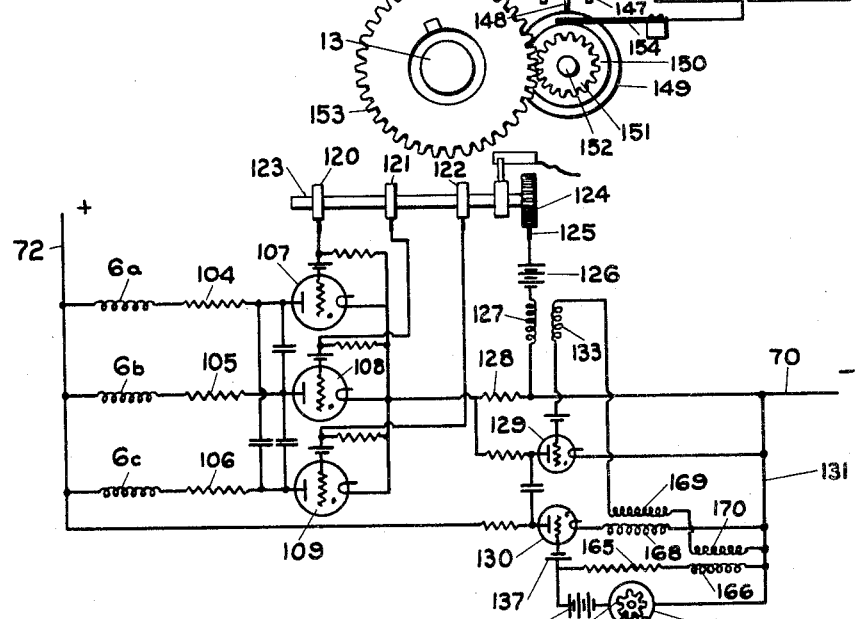
Figure 8 is a circuit diagram for electrically controlling a step motor to reduce the field strength at proper times in order to prevent or reduce rotor oscillations. The motor shaft and attached gear and an associated generator are shown.

It is obvious that the belt currents may be used to control the grid circuits of thyratrons supplying current to the motor windings as illustrated by the circuits shown in Figures 7 and 8. In that event the belt distributor would be substituted for distributor 124 and the mechanical damping as shown in Fig. 5 or Figure 1 can be substituted for the electrical damping systems of Figures 7 and 8. The thyratrons are advantageous in that weak grid currents can be used, thereby preventing excessive arcing.

The motor circuit of Figure 5, or its thyratron equivalent, can be used for many controls such as automatic machine tool controls. In this case three motors can be used, one to shift the table of a milling machine, for instance; another motor to shift the cross head, and another to lift or lower the cutting tool. Nine rows of contacts on one tape can be used instead of three rows, so that the operation of all three motors can be synchronized by the tape. In this way, a three dimensional control can be utilized for reproducing any desired movement of machine parts of other devices such as gun tracking or positioning mechanism, radar devices, computers, and other devices.

Photoelectric cells can be used; the moving tape modulating the photocell currents by means of dark or clear spots in the transparent tape, or by means of punched holes in an opaque tape. Furthermore, spots of metallic paint on the tape can operate the thyratrons by change of capacitance in the grid circuits as the spots pass near small metal plates connected to the grids; or magnetic spots can be used to vary the grid charges as a result of varied magnetically induced currents.

In Figure 7 positive line 72 is connected to one end of each of motor field windings 6a, 6b, and 6c. The other ends of these windings are connected, respectively, with resistors 104, 105, and 106 in series with the windings and thyratrons 107, 108, and 109 the cathodes of which are connected to conductor 110 which is connected with negative line 70. Quenching condensers 111, 112, and 113 are connected between the anodes of thyratrons 107, 108, and 109 so that when any one of these thyratrons is fired any other of the three thyratrons which may be conducting current will be extinguished. The potential drops across resistors 104, 105, 106 are used to charge the condensers in known manner.

The grids of the three thyratrons are negatively biased by connected batteries or other potential sources 114, 115, and 116 the positive terminals of which are connected to cathode conductor 110 through respective resistors 117, 118, and 119. The positive terminals of these bias batteries are also connected in the same order through suitable brushes to slip rings 120, 121, and 122 fixed on shaft 123 and insulated therefrom. Commutator 124 is fixed coaxially to shaft 123 and has three groups of equally spaced contact segments, each group having a plurality of the segments connected together. One group of segments is connected to slip ring 120 by means of a conductor passing through tubular shaft 123 and the next group in order, considering one direction of rotation of the commutator, is similarly connected to slip ring 121, and the third group to be brought into contact with brush 125 as the commutator is revolved in the stated direction is in the same manner connected to slip ring 122.

The positive terminal of battery or other potential source 126 is connected with brush 125 and the negative terminal is connected with negative line 70 through transformer primary 127. Line 70 is connected to cathode conductor 110 through resistor 128. The cathodes of thyratrons 129 and 130 are connected to conductor 131 which is connected to line 70. The negative terminal of bias battery 132 is connected to the grid of tube 129 and the positive terminal of this battery is connected to line 70 and conductor 131 through transformer secondary 133 which is so connected that it will apply an induced positive pulse to the grid of tube 129 to fire that thyratron each time there is a suitable fluctuation of current strength through primary winding 127 due to brush 125 separating from one commutator segment and making contact with the next succeeding segment, in either direction of rotation of shaft 123. Therefore each time any one of the thyratrons 107, 108, or 109 is fired, thyratron 129 is also fired.

Resistor 134 is connected between the anode of tube 129 and conductor 110. This resistor is of considerably lower resistance than resistor 128 so that the current passing through any field winding and series-connected thyratron 107, 108, or 109, will be relatively large when tube 129 is conducting current and relatively weak when this tube is not conducting.

The anode of tube 130 is connected to positive line 72 through voltage-dropping resistor 135 and quenching condenser 136 is connected between the anodes of tubes 129 and 130. The negative terminal of bias battery 137 is connected to the grid of tube 130 and the positive terminal of this battery is connected to cathode conductor 131, through transformer secondary 138. The primary 139 of this transformer is connected to one terminal of battery 140 and to contact arm 141 which is screwed to insulating bar 142 fastened to flanged armature 143 of solenoid 144 suitably attached to the motor. A compression spring pressing against the flange and the solenoid normally keeps the flange against stop 145. Contact arm 146 is slotted and is slidable along bar 142, as may be arm 141, so that the positions of the contacts 146 and 147 may be changed relative to bar 142 and the contact arm can be screwed tightly to this bar at any desired distance of separation. Brush 154 is suitably supported and rubs against disc 150 or ring 149, and is connected with the other terminal of battery 140 which energizes transformer primary 139 when contact 148 touches either of contacts 146 and 147.

Double contact 148 is fastened to metal slip ring 149 which is closely fitted around metal disc 150 fastened coaxially to pinion 151 which is attached to shaft 152 which has suitable bearings for rotation. Ring 149 has a recessed pin in register with a groove around the periphery of disc 150 so the ring will not slip off the disc. There is considerable friction between disc 150 and ring 149 and resilient spring elements may be used to insure this friction. Pinion 151 is meshed with larger gear 153 fastened to motor shaft 13 which is driven by previously described step motor 1 not shown.

Slip ring 155 is fastened to shaft 123 and is connected to line 72 by means of conductor 156 and a suitable brush. This slip ring is electrically connected with friction slip ring 157 surrounding shaft 123 and carrying arm 158 which may be rotated down into contact with contact strip 159 or upward to separate the contacts. Conductor 160 connects contact 159 to one terminal of solenoid 144 the other terminal of which is connected with line 70 by conductor 161.

In operation, if shaft 123, which has suitable bearings not shown, is rotated manually or by any other means, in proper direction, commutator 124 will distribute current from battery 126 to resistors 117, 118, and 119 in sequence so that tubes 107, 108, and 109 will be fired in proper order to cause say counterclockwise rotation of shaft 13, due to energization of field windings 6a, 6b, and 6c in proper order. When any tube 107, 108, or 109 is fired, any other of the tubes is extinguished as described. Clockwise or forward rotation of shaft 13 causes pinion 151 and attached disc 150 to be rotated in opposite direction and therefore, due to friction between ring 149 and disc 150, contact 148 is kept pressed against contact 146 as long as shaft 13 is rotating in forward direction. Therefore step movements of the rotor in forward direction will maintain contacts 148 and 146 closed so that current from battery 140 flows through primary winding 139.

When back-swing starts, for each step of movement of the rotor, contact 148 is quickly separated from contact 146, due to the stepped-up gear ratio, and the magnetic field associated with transformer primary 139 collapses and induces a pulse in secondary 138 in proper direction to overcome the negative grid bias of battery 137 and so to fire thyratron 130. When this happens thyratron 129, which has previously been fired by a pulse from transformer secondary 133, is extinguished and current flow through any field winding 6a, 6b, or 6c, has to pass through limiting resistor 128 so that the current is considerably reduced. Therefore the magnetic pull during back-swing is weakened or almost completely eliminated, as desired, and the tendency for the rotor to oscillate is largely obviated. The degree of magnetization during back-swing for the step movements can be regulated by by varying the value of resistor 128. This can be chosen so that the magnetization is just sufficient to prevent the rotor from drifting. This magnetization can be made variable with the load if desired. For this purpose element 128 could be a varistor or other element the impedance of which is proportional to current. Similarly, any suitable variable resistance or impedance regulated by the degree of load current can be employed, or a centrifugal governor on the motor shaft can be made to regulate the value of the resistance of element 128 or equivalent element. Figure 19 shows variable resistance 128 over which contact arm 128a, pivoted at 117a, can be moved by plunger 118a of solenoid 119a which is connected in series with arm 128a and line 70. Spring 120a normally pulls arm 128a in a direction to increase the effective resistance of element 128, and the solenoid pulls the arm in opposite direction to decrease the resistance in circuit with line 70. The amount of pull of the solenoid will, therefore, increase with increase of load current since the resistance of element 128 in circuit will decrease with increase of load current passing through the thyratrons 107, 108, and 109 and through line 70. Dashpot 121a may be employed if desired.

The current passing through tube 130 does not enter the motor windings. Thyratron 129 is fired again when the next succeeding commutator segment causes one of the tubes 107, 108, or 109 to be fired. Therefore the field current is applied to the motor at the beginning of each step displacement of the rotor and the field current is weakened near the end of the step displacements or shortly after back-swing of the rotor starts so that smooth operation results.

When shaft 123 is rotated in the direction described, contact 158 is lifted away from contact 159 and is held against a suitable stop as a result of the sliding friction between sleeve 157 and shaft 123. If this shaft is rotated in opposite direction, contact 158 is quickly moved down against contact 159 so that solenoid 144 is energized and bar 142 is pulled to the right until the armature or some other part strikes a stop. Contact 147 is then out of position so that it will not be struck by contact 148 during "back-swing," but contact 146 is then in position for contact 148 to strike it when shaft 152 is driven in reverse direction. Then these contacts function in the same manner as described for contacts 148 and 147.

In Figure 8 the circuit is essentially the same as in Figure 7, as indicated by similar reference characters. In this circuit, however, relatively small direct current generator 162 is suitably mounted on the motor and has small pinion 163 attached to its shaft. Gear 164, having a relatively large number of teeth, is meshed with pinion 163 and is fastened to motor shaft 13. Resistor 165 and transformer secondary 166 are connected in series between the positive terminal of bias battery 137 and conductor 131 and the positive terminal of battery 167 is connected to the battery-connected terminal of resistor 165. The negative terminal of battery 167 is connected to the negative terminal of D. C. generator 162 the positive terminal of which is connected to conductor 131. It is obvious therefore that the potential difference developed by the generator is opposed by the potential of battery 167 which is of higher value than that of battery 137 but of lower value than the maximum developed potential of the generator.

Transformer secondary 168 is connected in series with tube 130 as shown and associated primary 169 is connected from secondary 133 to conductor 131, through transformer primary 170 as indicated. Primary 170 is connected to provide a potential pulse in resistor 165 to make the grid bias of tube 130 temporarily negative as each induced pulse occurs in transformer secondary 133 upon firing a succeeding tube 107, 108, or 109. Simultaneously primary 169 induces a reverse pulse in secondary 168 which tends to reduce the effective anode potential across tube 130.

In operation, when motor shaft 13 is rotating in forward direction at an appreciable velocity, or even at low velocity, the E. M. F. of generator 162 is greater than that of opposing battery 167 so that the current flow through resistor 165 assists battery 137 in keeping the grid of tube 130 negative, so that tube does not fire. The current conduction for forward rotation is therefore through tube 129 which is fired as each segment of commutator 124 makes contact with brush 125 as described. Tube 129 passes a heavy current for forward step movements of the rotor. As the rotor decelerates for each step displacement the E. M. F. developed by generator 162 decreases until it is sufficiently less than that of battery 167 so that this battery biases tube 130 positively to fire it. When that happens tube 129 is extinguished and current passing through any one of tubes 107, 108, or 109 and the associated motor windings will be considerably reduced by resistor 128 in circuit and so the magnetizing effect for back-swing is greatly reduced and the tendency for the rotor to oscillate is lessened.

By choosing the values of the potentials of batteries 137 and 167 and the characteristics of generator 162, the firing of tube 130 may be pre-set to occur nearly at the ends of forward step movements of the rotor or before. The point of firing can be adjusted by varying the effective voltage of battery 167 or that of the generator. A considerable degree of control over the speed of the motor can be achieved in this way.

When the next succeeding tube 107, 108, or 109 is fired by the commutator, tube 129 is again fired and the reverse pulse from primary 169 together with the negative pulse in secondary 166 prevent battery 167 from firing tube 130 at the beginnings of step movements when generator 162 is not producing appreciable negative biasing voltage. Suitable condensers can be used to prolong the negative pulses if necessary.

In fragmentary Figure 13, tube 130 is used in the same general circuit as shown in Figure 7 but in this case hard vacuum tube 171 is connected in series with primary 139 and battery 140 the positive terminal of which is connected with the anode of tube 171. The grid of this tube is normally biased negatively by battery 172 connected to the cathode through resistor 173 which is connected in series with battery 167 and opposed D. C. generator 162 driven by the rotor as previously described. When, therefore the voltage of the generator falls sufficiently, battery 167 passes current through resistor 173 in a direction to increase the bias of the grid of tube 171 in positive direction. Since this occurs suddenly an induced pulse in transformer secondary 138 fires tube 130 for purposes already described. In this case battery 167 cannot cause firing of tube 130 when the generator is not producing voltage.

Figure 14 shows in fragmentary manner, another circuit for firing tube 130. In this case resistor 174 is connected from the positive terminal of battery 137 to the cathode, and resistor 175 is connected in parallel with it through condenser 176. Battery 167 and generator 162 are opposed and are connected in series with resistor 175. When the rotor speed is suddenly reduced near the ends of forward step movements, battery 167 causes a surge of reverse current through resistor 175 so that a positive pulse is applied to the grid of tube 130 to fire it. Condenser 176 prevents battery 167 from firing tube 130 when generator 162 and the attached rotor are moving slowly.

Figure 15:
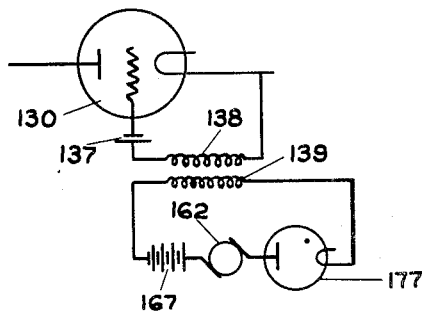
Figure 15 is a fragmentary circuit diagram showing still another modification of the generator-controlled circuit of Figure 8.

In Figure 15 gaseous tube 177 is connected in series with generator 162, opposed battery 167, and transformer primary 139. Therefore, when the E. M. F. developed by generator 162 drops sufficiently, battery 167 fires tube 177 and sends a pulse of current through primary 139 which induces a positive pulse in secondary 138 to fire tube 130. As the rotor and attached generator are accelerated, the negative voltage of the generator cancels the positive voltage of battery 167 and so the tube 177 is then extinguished.

In these circuits for reducing field magnetization during back-swing of the rotor, the connections of the generator, or other suitable connections can be reversed when it is desired to cause the rotor to revolve in opposite direction.

Figure 10:
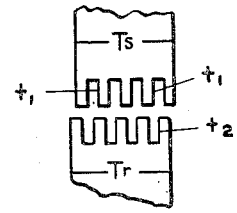
Figure 10 is a fragmentary end view of a tined or multi-element stator tooth and a similar associated rotor tooth.

The individual teeth of the stator $T_s$, as shown in Figure 10, can be divided into a plurality of narrow teeth $t_1$ and similarly, each tooth $T_r$ of the rotor can have a plurality of narrow teeth $t_2$ so that the narrow adjacent teeth $t_1$ and $t_2$ will tend to concentrate the magnetic flux into small areas and the teeth $T_s$ and $T_r$ can therefore be magnetically locked into more definite alignment with less relative movement between them in order to produce net holding flux.

Figure 9:
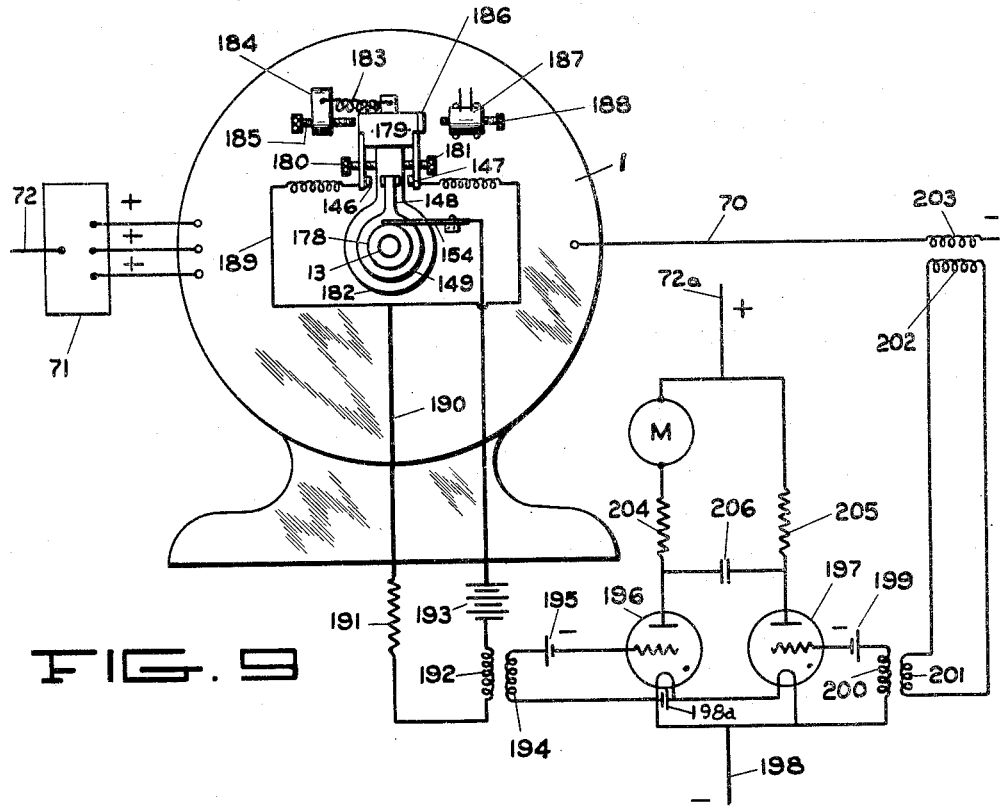
Figure 9 is an end view of a step motor with three field sections as before illustrated and showing an associated electrical circuit for controlling a magnetic clutch or other suitable device, for preventing rotor oscillations.

Figure 9 shows an end view of my motor, with an associated circuit for operating a magnetic clutch, to prevent rotor oscillations and for other purposes. Figure 11, which is a front view of the motor shown in Figure 9, indicates the arrangement of the motor and clutch. In Figure 9, motor 1 has shaft 13 with slip ring and friction slip ring 149 carrying double contact arm 148 which may be brought into contact with either contact 146 or contact 147 mounted on flexible contact arms which are fastened to insulating block 179 and which may be adjusted in relative position by threaded screws 180 and 181 passing through the arms and screwed into the block. This block is integral with insulating ring 182 which may be rotated through an angle about a suitable sleeve bearing extending from the adjacent end face of motor 1. Tension spring 183 is attached to an extension from block 179 and to lug 184 extending from the motor casing and which serves also as a bearing for thumbscrew 185 threaded through it. Spring 183 normally holds block 179 against the end of thumbscrew 185 as a stop.

Iron plug 186 is attached to the right face of block 179 and may be attached by magnet 187 which is fastened to the motor casing and which may be suitably energized when the direction of rotation of the motor is reversed. Thumbscrew 188 is threaded through the core of the magnet and serves as an adjustable stop against which plug 186 may strike when the magnet is energized. In this case contact 147 is moved away from contact 148 and contact 146 is brought into engagement with contact 148, when shaft 13 revolves in counterclockwise direction.

Contacts 146 and 147 are connected together by flexible conductor 189 which is connected with conductor 190 leading to current limiting resistor 191 in series with transformer primary 192, with battery or other current source 193, and brush 154 making contact with slip ring 178 connected to contacts 148. Transformer secondary 194 is associated with primary 192 and is connected between the positive terminal of grid bias battery 195 and the cathode of thyratron 196. The cathode of thyratron 197 is supplied energy from a source 198a supplying the cathode of tube 196, and the negative line 198 for the tubes is connected to the grid of thyratron 197 and the positive terminal of this battery is connected to the cathode of tube 197 through transformer secondary 200. The associated transformer primary 201 is connected in series with transformer secondary 202 which is in inductive relationship with transformer primary 203 in series with negative line 70 leading from motor 1. Positive line 72 is connected as usual through distributor 71 leading to the motor.

Positive line 72a, which may be connected with line 72, is connected to the anode of thyratron 196 through magnetic clutch M and resistor 204 in series, and line 72a is connected to the anode of thyratron 197 through resistor 205. Quenching condenser 206 is connected between the anodes of tubes 196 and 197.

Figure 11 shows the arrangement of magnetic clutch M with respect to the rest of the motor. Bearing yoke 207 is attached to the right end plate of motor 1 and serves as a bearing for shaft 208 carrying attached pinion 209 meshed with larger gear 210 which is fastened to motor shaft 13. Shaft 208 extends through the yoke and has attached concentric iron or steel disc 211 carrying a circular row of radial magnetizable, closely spaced teeth 212. A circular row of radial and similarly spaced magnetizable iron or steel teeth 213 are arranged around the annular face or edge of magnetizable field member 214 (Fig. 12) which has control core member 215 around which toroidal magnetizing winding 216 is placed. Iron or steel field member 214 is rigidly fastened to block 217 which is bolted to base 218 to which motor 1 is also rigidly attached. Element 214 can be supported by the motor casing if desired. The radial teeth 213 are placed in axial alignment with similarly spaced teeth 212 and closely adjacent thereto. It is obvious therefore that a powerful magnetic braking action on disc 211 and consequently on shaft 13 is exerted when the winding 216 of unit 214 is energized. This is particularly true since the stepped-up gear ratio causes disc 211 to revolve a number of times for every revolution of shaft 13. This ratio also aids in stopping shaft 13 at desired angular positions, even though the teeth 212 and 213 may be limited in number.

The magnetizing unit 214 or rather winding 216 is connected in circuit as shown in Figure 9. In operation, each time one of the three field windings 6a, 6b, or 6c is energized a pulse of current passes through line 70 and primary 203 so that a pulse passes through secondary 202 and primary 201. This induces a positive potential pulse in secondary 200 to fire tube 197. Assuming that the rotation of shaft 13 is in counterclockwise direction for each step displacement of the rotor, contact arm 148, due to its slipping frictional connection with shaft 13, will be moved from its neutral position shown until it strikes contact 146. Arm 148 is therefore maintained in contact with element 146 during counterclockwise step displacements of the rotor. In this condition current from battery 193 energizes transformer primary 192 which is connected so that a positive pulse on the grid of tube 196 will be induced in secondary 194 only when the circuit is broken, due to collapse of the magnetic field. When backswing of the rotor begins, after a forward step movement contact 148 is separated from contact 146 and tube 196 is therefore fired as described. When this happens current from lines 72a and 198 passes through winding 216 of magnetic clutch M and this clutch magnetically locks disc 211 and the connected rotor or motor 1 so that no appreciable back-swing occurs. When the next succeeding windings 6a, 6b or 6c is energized tube 197, which was extinguished by condenser 206 when tube 196 was fired, is again fired and tube 196 is automatically extinguished. When tube 197 is fired the current passes through resistor 205 and not through the magnetic clutch which then releases its grip on the rotor.

It is apparent that many changes of detail can be arranged without departing from the principles I have disclosed.

What I claim is:

1. In an electromagnetic stepping device including stator means and rotor means, a plurality of groups of stator poles and associated rotor poles, a plurality of winding means for said groups of poles, means for energizing said winding means for said group in predetermined order, and electrical means associated with said rotor for limiting movement thereof in direciton opposite to the direction as determined by the order of magnetization of said winding means to partial step displacements of said rotor.

2. In an electromagnetic device including stator means and rotor means, a plurality of groups of stator poles and associated rotor poles, said groups of stator and rotor poles being relatively positionally phased, a plurality of winding means for said groups of poles, means including current control means for supplying current to said group winding means in predetermined order, means for limiting movement of said rotor means in a direction opposite to the direction as determined by the order of energization of said group winding means, and means for reversing effective direction of said rotor movement-limiting means.

3. The device of claim 2, said means for reversing the effective direction of said rotor movement-limiting means including electromagnetic means for shifting said rotor movement-limiting means and relay means controlling current to said electromagnetic means, said relay means being electrically connected with said means for supplying current to said group winding means and being responsive in direction of movement according to the order of supplying current to said group winding means.

4. In a step motor including stator means and rotor means, a plurality of groups of stator poles and associated rotor poles, said groups of stator and rotor poles being relatively positionally phased, a plurality of winding means for groups of said poles, means for energizing said group winding means in predetermined order, and brake means including cam means and rollable means cooperating therewith to lock said rotor against movement in a direction opposite to the direction as determined by the order of energization of said winding means.

5. The device of claim 4, and including means for setting said brake for said rotor means for either direction of movement of said rotor means.

6. The device of claim 4, and including yielding means for setting said brake for one direction of movement of said rotor means and electromagnetic means for setting said brake for the opposite direction of rotation of said rotor means.

7. In a step motor including stator means and rotor means, a plurality of groups of stator poles and associated rotor poles, said groups of stator and rotor poles being relatively positionally phased, a plurality of winding means for groups of said poles, means for energizing said group winding means in predetermined order, brake means for limiting movement of said rotor means to less than one step displacement thereof in a direction opposite to the direction of rotation thereof as determined by the order of energization of said winding means, and means for biasing said brake means to limit rotation of said rotor for either direction.

8. The device of claim 7, said brake biasing means including switch means and actuating selsyn motor means responsive in direction of movement to the order of energization of said winding means.

9. In an automatic control system, step motor means including stator means and rotor means, a plurality of groups of stator poles and rotor poles, a plurality of winding means for groups of said poles, current control means for energizing said group winding means in predetermined order, brake means for limiting movement of said rotor means in direction opposite to that as determined by the order of energization of said winding means, means for biasing said brake means to be effective for forward or reverse rotation of said rotor means, belt or tape means for controlling said current control means, and means for moving said belt or tape means.

10. The device as described in claim 2, said means for reversing the effective direction of said rotor movement-limiting means including electromagnetic means for shifting said rotor movement-limiting means and relay means controlling current to said electromagnetic means, said relay means being electrically connected with said means for supplying current to said group winding means and being responsive in direction of movement according to the order of supplying current to said group winding means.

11. In a step motor including stator means and rotor means, a plurality of groups of stator poles and associated rotor poles, a plurality of winding means for causing magnetization of groups of said poles, means for energizing said winding means in predetermined order to cause rotation of said rotor means in steps, magnetic brake means associated with said rotor means for stopping its movement, and means responsive to direction of movement of said rotor to allow step movement thereof in one direction of rotation and to cause energization of said magnetic brake means to prevent appreciable rotation of said rotor in direction opposite to said one direction.

12. In an electromagnetic device including stator means and rotor means, a plurality of groups of stator poles and associated rotor poles, a plurality of winding means for groups of said poles, means for energizing said winding means in predetermined order to cause rotation of said rotor means in predetermined direction, and instantaneously operative means continuously effective for locking said rotor means against movement in a direction the reverse of said predetermined direction.

13. In a step motor including stator means and rotor means, a plurality of groups of stator poles and associated rotor poles, a plurality of winding means for groups of said poles, means for energizing said winding means in predetermined order to cause rotation of said rotor means in predetermined direction, and instantaneously operative means continuously effective during step movements of said rotor means in said predetermined direction for locking said rotor means against movement in a direction the reverse of said predetermined direction.

14. In a step motor, a rotor and a stator one of which has a plurality of magnetizable teeth and the other of which has a plurality of groups of magnetizable poles, said groups of poles being positionally phased with respect to said teeth, means for magnetizing said groups of poles in predetermined order to cause rotation of said rotor in predetermined direction, and instantaneously operative means continuously effective during said rotation for locking said rotor against movement in a direction the reverse of said predetermined direction.

15. The device as described in claim 14, magnetization of any said group of poles being maintained until another said group of poles is magnetized.

16. In a step motor, a rotor and a stator one of which has a plurality of magnetizable teeth and the other of which has a plurality of groups of magnetizable poles, said groups of poles being positionally phased with respect to said teeth, means for magnetizing said groups of poles in predetermined order to cause rotation of said rotor in predetermined direction, a member having a circular surface rotated by said rotor, a locking element fastened to said motor, another element adapted to be pressed against said locking element and said surface to lock said surface against movement in direction the reverse of said predetermined direction while allowing movement thereof in said predetermined direction, and means pressing said other element against said locking element and said surface.

17. The device as described in claim 16, said other element comprising a rollable member.

18. The device as described in claim 16, said pressing means including a spring.

19. The device as described in claim 16, said pressing means being continuously effective for each step movement of said rotor.

20. The method of operating a plural phase step motor, said method comprising, energizing said phases in sequence to cause step rotation of said motor in predetermined direction, locking the rotor of said motor against appreciable rotation in direction the reverse of said predetermined direction, and maintaining the energization of any phase until the next phase is energized.

21. The device as described in claim 16, said pressing means being continuously effective during rotation of said rotor in said predetermined direction.

22. In an automatic control system, a three phase step motor, a winding for each of said phases, current control means for causing energization of said windings in sequence, means including record means having three rows of spaced characteristics for causing sequential actuation of said current control means to produce sequential energization of said windings, said spaced characteristics in said rows being longitudinally staggered, reversal of rotation of said motor being accomplished by reversing the staggering of said characteristics associated with the first and third phases to cause reversal of the order of energization of the first and third windings.

23. In an electromagnetic device including stator means and rotor means, a plurality of groups of stator poles and associated rotor poles, said groups of stator and rotor poles being relatively positionally phased, a plurality of winding means for said group of poles, means for energizing said winding means for said groups in predetermined order, brake means associated with said rotor means for limiting the extent of movement thereof in one direction for any position of said rotor, and other brake means associated with said rotor means for limiting the extent of movement thereof in opposite direction.

24. In an electromagnetic device including stator means and rotor means, a plurality of groups of stator poles and associated rotor poles, a plurality of winding means for said groups of poles, means for energizing said winding means for said groups in predetermined order, locking means associated with said rotor for limiting movement thereof in a direction opposite to the direction as determined by the order of magnetization of said winding means, said locking means having a locking position and a non-locking position and being continuously in said locking position during rotation of said rotor in a first direction, and means sensitive to the direction of rotation of said rotor as determined by the order of magnetization of said winding means for placing said locking means in its non-locking position when said order of magnetization of said winding means dictates rotation of said rotor in a second direction.

25. In an electromagnetic device including stator means and rotor means, a plurality of groups of stator poles and associated rotor poles, a plurality of winding means for said groups of poles, means for energizing said winding means for said groups in predetermined order, locking means associated with said rotor for limiting movement thereof in a direction opposite to the direction as determined by the order of magnetization of said winding means, said locking means being conditionable into a locking condition and a non-locking condition and being continuously in a locking condition during rotation of said rotor in a first direction, and means sensitive to the direction of rotation of said rotor as determined by the order of magnetization of said winding means for placing said locking means in its non-locking condition when said order of magnetization of said winding means dictates rotation of said rotor in a second direction.

26. In an electromagnetic device including stator means and rotor means, a plurality of groups of stator poles and associated rotor poles, a plurality of winding means for said groups of poles, means for energizing said winding means for said groups in predetermined order, continuously operative locking means associated with said rotor for limiting movement thereof in a direction opposite to the direction as determined by the order of magnetization of said winding means, and means for releasing said locking means on reverse rotation of said rotor when the sequence of energizing said winding means dictates such reverse rotation.

27. In an electromagnetic device including stator means and rotor means, a plurality of groups of stator poles and associated rotor poles, a plurality of winding means for said groups of poles, means for energizing said winding means for said groups in predetermined order, first locking means associated with said rotor for limiting movement thereof in one direction, and second locking means associated with said rotor for limiting movement thereof in the opposite direction, one or the other of said two locking means being operative at all times, and the other locking means being inoperative at any instant the one locking means is operative.

28. In an electromagnetic device including stator means and rotor means, a plurality of groups of stator poles and associated rotor poles, a plurality of winding means for said groups of poles, means for energizing said winding means for said groups in predetermined order, first one way locking means associated with said rotor for limiting movement thereof in one direction, second one way locking means associated with said rotor for limiting movement thereof in the opposite direction, and means for rendering one of said locking means operative and the other inoperative to lock said rotor means against rotation in a direction opposite to that determined by the order of current energization of said group winding means.

29. A reversible electrical step motor capable of rotation in discrete steps comprising in combination, a stator, a rotor, plural winding means associated with at least one of said stator and rotor for imparting motion to said rotor in either a forward or reverse direction depending on the order of energization of said winding means, and means including a pair of overrunning elements associated with said rotor with one or the other of said elements being continuously in contact with said rotor for limiting movement thereof in the direction opposite to the direction determined by the order of energization of said winding means regardless of the direction of rotation of said rotor.

30. In an electromagnetic device including stator means and rotor means, a plurality of groups of stator poles and associated rotor poles, a plurality of winding means for said groups of poles, means for energizing said winding means for said groups in predetermined order, and one way locking means associated with said rotor means for limiting the extent of movement of said rotor in a first direction when the order of energizing said winding means dictates movement of said rotor in a second direction and permitting free movement of said rotor in said first direction when the order of energization of said winding means dictates movement of said rotor in said first direction.

31. In an electromagnetic device including stator means and rotor means, a plurality of groups of stator poles and associated rotor poles, a plurality of winding means for said groups of poles, means including current control means and commutating means to actuate said current control means in predetermined order for supplying current to said group winding means in predetermined order to cause step movement of said rotor means, and one way locking means associated with said rotor means for limiting the extent of movement of said rotor in a first direction when the order of supplying current to said winding means dictates movement of said rotor in a second direction and permitting free movement of said rotor in said first direction when the order of supplying current to said winding means dictates movement of said rotor in said first direction.

32. A device as set out in claim 31 wherein said current control means comprises gaseous current control tubes.

33. A device as set out in claim 31 wherein said commutating means includes a belt or tape having a plurality of contact members, circuit closing means for energizing said current control means and adapted to be made effective by said contact members, and means for moving said belt.

34. In an electromagnetic stepping device including stator means and rotor means, a plurality of groups of stator poles and associated rotor poles, said groups of stator and rotor poles being relatively positionally phased, a plurality of winding means for said groups, means for energizing said winding means in predetermined order to cause step by step rotation of said rotor, said rotor overshooting each stepwise position and tending to reverse its motion, a magnetic brake associated with said rotor, and electrical means controlled by said rotor for magnetizing said brake once each step as said rotor is substantially in its most advanced position for each step movement thereof.

35. In a step motor, a rotor and a stator one of which has a plurality of magnetizable teeth and the other of which has a plurality of groups of magnetizable poles, said groups of poles being positionally phased with respect to said teeth, means for magnetizing said groups of poles in predetermined order to cause rotation of said rotor in a predetermined direction, and means for locking said motor against rotation in a direction the reverse of said predetermined direction when said rotor is at substantially zero speed at the ends of step movements thereof, said locking means being made effective as a result of movement of said rotor.

36. In an electromagnetic device including stator means and rotor means, a plurality of groups of stator poles and associated rotor poles, said groups of stator and rotor poles being relatively positionally phased, a plurality of winding means for said groups of poles, means including current control means and commutating means to actuate said current control means in predetermined order for supplying current to said group winding means in predetermined order to cause step movement of said rotor means, means associated with said rotor means for limiting the extent of movement thereof in a direction opposite to the direction as determined by the order of supplying current to said winding means, and means for reversing the effective direction of said movement-limiting means for said rotor means.

37. In an electromagnetic device including stator means and rotor means, a plurality of groups of stator poles and associated rotor poles, a plurality of winding means for causing magnetization of groups of said poles, means for energizing said winding means in predetermined order, magnetic brake means associated with said rotor means for limiting movement thereof, means associated with said rotor means for energizing said magnetic brake means in accordance with direction of movement of said rotor means, and amplifying drive means connecting the shaft of said motor with a movable member of said magnetic brake means to cause a predetermined angular rotation of said shaft to produce a greater angular rotation of said member.

38. In a machine tool system, a plurality of movable members, a plurality of three phase step motors for causing movement of said members, a plurality of electronic tubes for supplying current to the phases of said motors, a belt or tape having three rows of spaced characteristics for each said motor, means for sensing said characteristics, means associating said sensing means with said electronic tubes to control said tubes in accordance with said characteristics, means for moving said belt or tape, and biased locking means to permit only one way rotation of the rotors of said motors, and means for reversing the effective direction of braking of said brake means.

References Cited in the file of this patent

UNITED STATES PATENTS

| | | |
|---|---|---|
| 1,301,050 | Hagman | Apr. 15, 1919 |
| 1,440,729 | French | Jan. 2, 1923 |
| 1,605,571 | Sperry | Nov. 2, 1926 |
| 1,890,752 | Sanford | Dec. 13, 1932 |
| 1,977,745 | Thompson | Oct. 23, 1934 |
| 2,030,277 | Taylor | Feb. 11, 1936 |
| 2,213,108 | Pollard | Aug. 27, 1940 |
| 2,414,787 | Post | Jan. 21, 1947 |
| 2,438,098 | Tandler et al. | Mar. 16, 1948 |
| 2,445,773 | Frost | July 27, 1948 |
| 2,449,020 | Spraragen | Sept. 7, 1948 |
| 2,489,689 | Wald | Nov. 29, 1949 |
| 2,508,639 | Field | May 23, 1950 |
| 2,528,181 | Sacchini | Oct. 31, 1950 |
| 2,537,770 | Livingston et al. | Jan. 9, 1951 |
| 2,567,422 | Camp | Sept. 11, 1951 |
| 2,576,903 | Imm | Nov. 27, 1951 |
| 2,578,648 | Thomas | Dec. 11, 1951 |
| 2,651,746 | Gano | Sept. 8, 1953 |